INVENTOR
GAIL E. ROGGE

BY Kimmel, Crowell & Weaver

ATTORNEYS

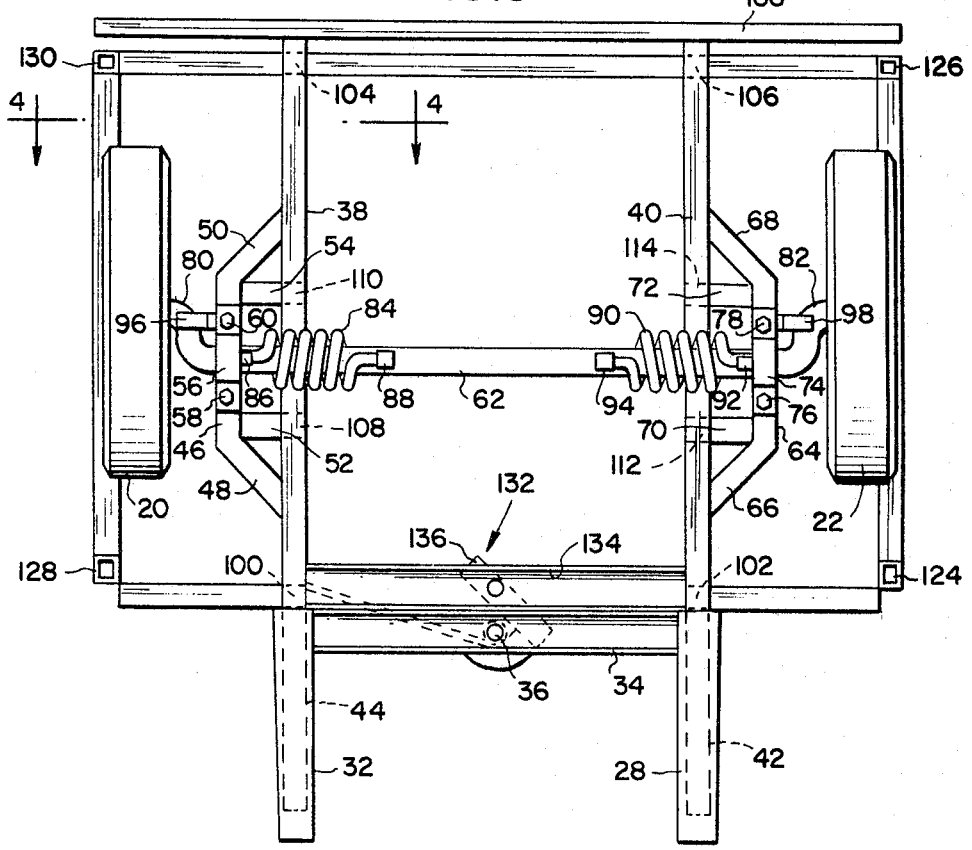
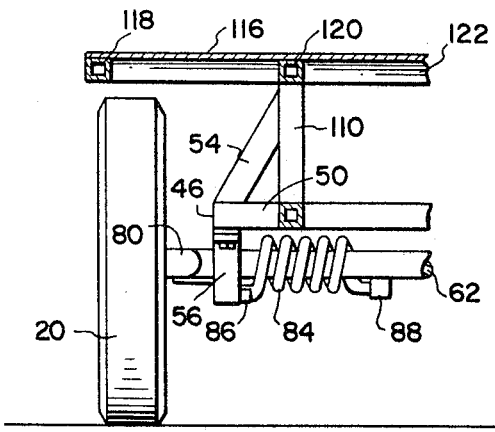

3,436,096
TANDEM AXLE ACCESSORY FOR
PICKUP TRUCKS
Gail E. Rogge, Ida Grove, Iowa 51445
Filed June 21, 1967, Ser. No. 647,772
Int. Cl. B60r 27/00; B60p 3/40, 3/42
U.S. Cl. 280—150                                           2 Claims

ABSTRACT OF THE DISCLOSURE

A combination pickup, camper house body, and tandem axle support for a camper house in which the tandem axle support is rigidly secured to the rear of the pickup for supporting a part of the camper house is disclosed.

BACKGROUND OF THE INVENTION

Field of the invention

This invention relates to land vehicles and more particularly to a trailer or follower for a self-propelled land vehicle which is adapted to provide additional load bearing support surface for carrying camper bodies and other heavy loads.

Description of the prior art

It is known in the prior art to provide a trailer which is connected to a self-propelled vehicle in a manner which permits movement in between the trailer and the vehicle such as by a pivotal connection. It is comparatively common practice to provide trailers which include a load bearing surface which cooperate with a load bearing surface on a vehicle for carrying heavy loads. Generally speaking, such trailer arrangements are highly satisfactory; however, it is often desirable to provide only a short extension to a vehicle such as a pickup, station wagon, passenger car or the like, wherein the primary purpose is to provide additional load bearing capacity rather than to provide a substantial extension of the length of the vehicle. Accordingly, it is an object of this invention to provide a follower for a self-propelled vehicle which is adapted to be detachably rigidly secured to the frame of a self-propelled vehicle to provide only a short extension of the length of the vehicle and to provide a substantial increase in load carrying capacity.

It has become common practice to mount camper bodies in the bed of pickups. Such camper bodies are frequently very heavy and tend to overload the pickup. In addition, such camper bodies often extend two or three feet beyond the end of the bed of the pickup. An addition to the excessive weight of the pickup, this arrangement significantly decreases the stability of the vehicle by concentrating excessive weight to the rear of the back axle. This decreases the effectiveness of the front brakes and steering power of the front wheels. Accordingly, it is an object of this invention to provide a short follower for a pickup or the like which will provide substantially increased load carrying capacity to reduce or prevent the instabilities normally resulting from the mounting of camper bodies on such vehicles.

It is known to provide auxiliary supports for camper bodies to permit the removal and mounting of such bodies from and onto pickups. However, in such devices of the prior art such auxiliary supports substantially increase the overall weight of the camper body and, during transit, serve no useful function. It is, accordingly, an object of this invention to provide a follower for a vehicle which may serve as a support for a camper body during transit and when the camper body is removed from or being removed from or mounted onto a pickup or the like.

Means for attaching trailers and the like are known in the prior art; however, such means are not generally applicable to short follower extensions of the type described herein. It is desirable, when only a short extension to a vehicle is made, with a primary object of providing additional load carrying capacity with a minimum extension of length to rigidly secure the follower to the vehicle. Accordingly, it is an object of this invention to provide novel and improved means for rigidly securing a follower to a vehicle.

SUMMARY

In brief, and without intention to limit the scope of the invention, the follower of this invention comprises a pair of wheels supported by an axle which is provided with a shock absorbing spring and carries a frame and a load bearing surface thereon. Means are provided for rigidly securing the follower to the frame of a self-propelled vehicle such as a pickup. Rigid securement is provided by a pair of tongues which are received in channels provided in the vehicle and by means for forcing the frame of the follower against the frame of the vehicle.

It is, accordingly, an object of this invention to provide a novel combined pickup, camper, and follower.

It is an additional object of this invention to provide a novel follower construction which is adapted to be rigidly secured to a vehicle.

An additional object is the provision of means for forcing the frame of a follower against the frame of a vehicle for rigid securement thereto.

An additional object is to provide a follower for a self-propelled vehicle which extends the length of the vehicle a minimum distance but substantially increases the load carrying capacity of the vehicle and which is provided with resilient shock absorbing means on the follower.

The specific construction of the follower, the tongues, and a securing means constitute specific objects of the invention.

The specific disclosure hereinafter and in the drawings to which reference is made also constitutes an object of the present invention.

BRIEF DESCRIPTION OF THE DRAWINGS

FIGURE 3 is a bottom view of the follower of this invention.

FIGURE 4 is an end view in partial cross section showing the wheel and supporting structure for the follower of this invention.

DESCRIPTIONS OF THE PREFERRED EMBODIMENTS

Figure 1:
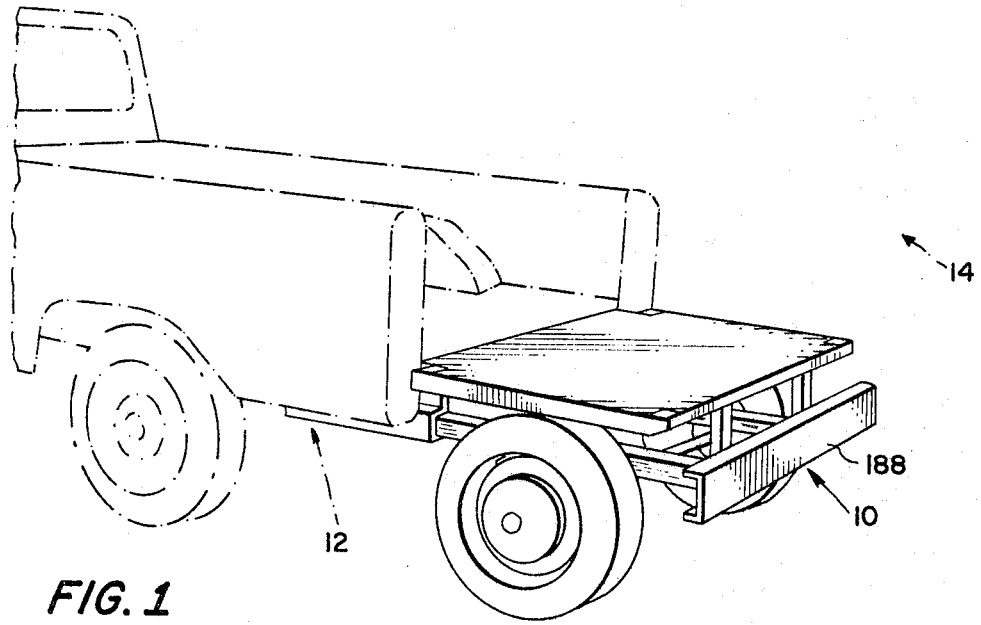
FIGURE 1 shows the combination of this invention including a pickup, the follower, and the camper supported by the pickup and the follower, the pickup and the camper being shown in phantom lines.

With reference first to FIGURE 1, the present invention, in combination, contemplates a follower 10 which is secured to the pickup 12 and which, in cooperation with the pickup, supports a camper body shown at 14. The pickup and the camper body may be of any conventional type. In addition, other vehicles than pickups may be used with this invention if desired.

Figure 2:
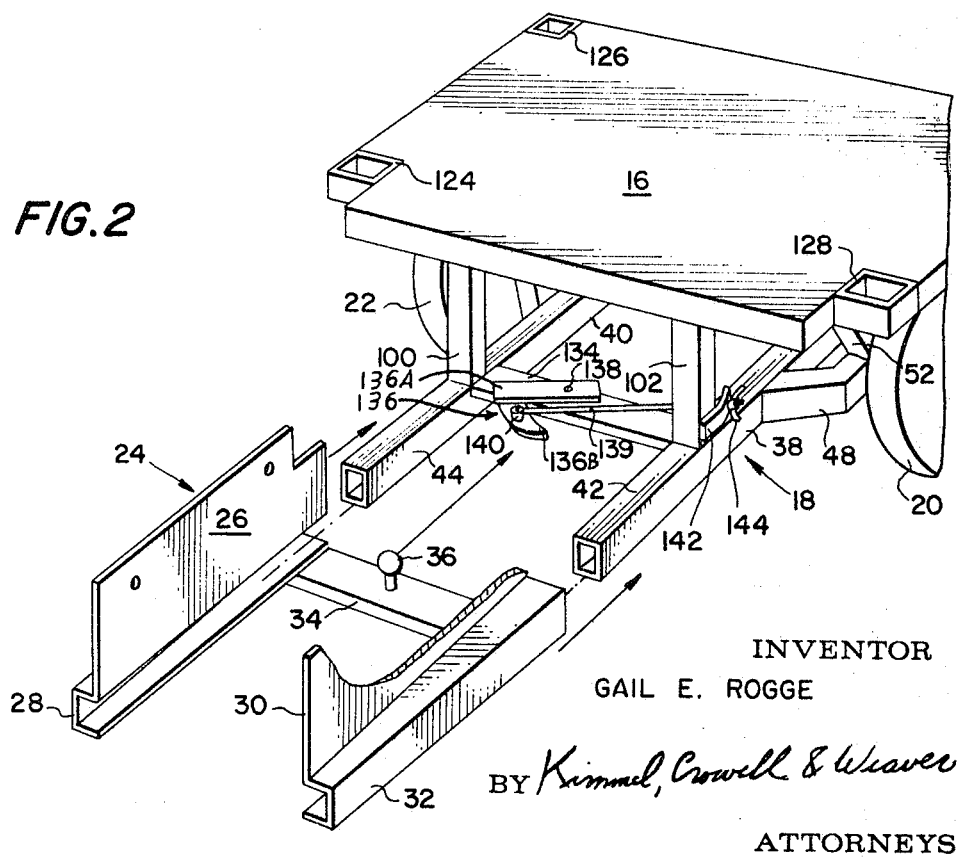
FIGURE 2 is a perspective view of the follower of this invention.

Referring to FIGURE 2, the follower 10 of this invention includes a load bearing surface 16 which is supported by a frame 18 and a pair of wheels 20 and 22. The frame 18 is secured, by means to be disclosed, to the pickup or like vehicle which is provided with a pair of receiving members such as that shown at 24 or the mirror image thereof. The receiving member 24 preferably comprises an apertured vertical plate 26 adapted to be secured to the frame of the self-propelled vehicle and a channel member 28 secured to the bottom thereof. Similarly, the mirror image comprises a vertical apertured plate 30 and a channel member 32. A cross member 34 is provided and, in the preferred embodiment, a ball hitch member 36 is secured to the cross member 34. It will be understood that the exact construction as disclosed in the drawings is not necessary and that equivalent constructions may easily be provided. The essential feature of these constructions is the provision of means for receiving tongues as will be described.

The frame 18 comprises a pair of elongate members 38 and 40 which are parallel and extend in the direction of travel of the follower 10. The elongate members 38 and 40 are preferably provided with a pair of forwardly extending tongues 42 and 44 which, as will be apparent from FIGURE 2, may be received in the channel members 28 and 32. The reception of these tongues, 42 and 44, in the channel members 28 and 32, assures a rigid non-pivotal supporting relation between the rear of the self-propelled vehicle and the follower.

Referring now to FIGURES 3 and 4, it will be seen that the elongate members 38 and 40 extend substantially the length of the follower in the direction of travel thereof and that the tongues 42 and 44 exend a significant distance in the direction of travel and are received in the channel members 28 and 32 such that, as shown in FIGURE 1, a continuous load supporting surface between the self-propelled vehicle and the follower is provided. The frame is carried on wheels 20 and 22 which are secured to the frame by the construction now to be described.

Still referring to FIGURE 3, and to FIGURE 4, a parallel brace 46 is secured to elongate member 38 by means of braces 48 and 50 which extend angularly in the plane of members 38 and 46 and are secured to the elongate member 36. A pair of braces 52 and 54 extend upwardly at an angle with respect to the parallel member 46 for providing additional support. A bearing member 56 is secured by means such as bolts 58 and 60 to the parallel member 46 and rotatably receives the axle 62.

Still referring to FIGURE 3, a similar arrangement is provided on the other side of the trailer wherein a parallel member 64 is secured by braces 66 and 68 which are connected to the elongate member and by upwardly angularly extending braces 70 and 72. A bearing member 74 is secured by means such as bolts 76 and 78 and rotatably receives the axle 62.

The axle 62 is provided with a double bend shown at 80 on one end and 82 at the other end and rotatably receives wheels 20 and 22 on the extreme ends thereof. A coil spring 84 is received about the axle 62 with the ends of the spring being fixed at keepers 86 and 88, on the parallel member 46 and on the axle respectively. A similar arrangement is shown on the other end with spring 90 and keepers 92 and 94. A pair of stops 96 and 98 are provided to limit the rotational movement of the axle 62. The stops 96 and 98 and the springs 84 and 90 along with the respective keepers 88 and 86 and keepers 92 and 94, are constructed and arranged to normally maintain the axle bends 80 and 82 in contact with the stops 96 and 98 and provide for resilient support of the frame 18 on the axle 62 by the torsion of the springs 84 and 90.

Referring now to FIGURES 2, 3 and 4, the frame 18 further comprises a pair of vertical supports 100 and 102 at the forward end of the follower, a pair of vertical supports 104 and 106 at the rear end of the follower, and two sets of vertical supports 108 and 110 on one side and 112 and 114 on the other side intermediate the front and rear sides of the follower. These vertical supports extend from the elongate members 38 and 40 to a load supporting bed portion 16 which is, in turn, supported in a rigid manner by a number of elongate supporting braces 118 and 120 and cross braces 122. These braces are shown to be hollow metal members but may be constructed in any desired manner.

Openings 124, 126, 128 and 130, as shown in FIGURES 2 and 3, are provided for supporting stock racks or sides when it is desired to use the invention for carrying heavy loads or loads of unusual length. Of course, the construction of the stock racks may be according to conventional design principles. Further, it will be understood that the actual construction of the frame is intended as exemplary and not in a limiting sense and that the essential feature of the frame is that there be provided at least one tongue or the equivalent, a pair of tongues, adapted and received by the self-propelled vehicle to maintain the follower in rigid following relation to the self-propelled vehicle.

Referring to FIGURES 2 and 3, a securing means 132 is provided for forcibly securing the follower to the self-propelled vehicle. The securing means is mounted on a cross member 134 extending between the elongate members 38 and 40 and comprises a rigid J-shaped hook member 136. The hook member 136 includes an elongated leg portion 136A from which laterally projects a foot section 136B. The leg portion 136A is pivotally secured by means such as a pin 138 to the cross member 134. An important feature of the invention is the provision of an operating arm 139 which is pivotally secured at one end thereof, as at 140, to the foot section 136B and extends at its other end to the side of the follower to permit movement of the hook from a first position wherein the follower 18 is released from the self-propelled vehicle to a second closed position in which the foot section 136B of the hook 136 engages the ball hitch member 36 to force the follower against the self-propelled vehicle. In a preferred embodiment, which is merely exemplary, a catch 142 may be apertured or slotted to receive the arm 139 and the arm 139 may be threaded on one end to receive a wing nut 144 for securely and permanently tightening the hook in engagement with the ball hitch member 36. An over-center hitch, or any desired means for securing the hook in the second closed position may be provided, the essential feature being the provision of such operating means as may be accessible from the side of the follower.

Figure 5:
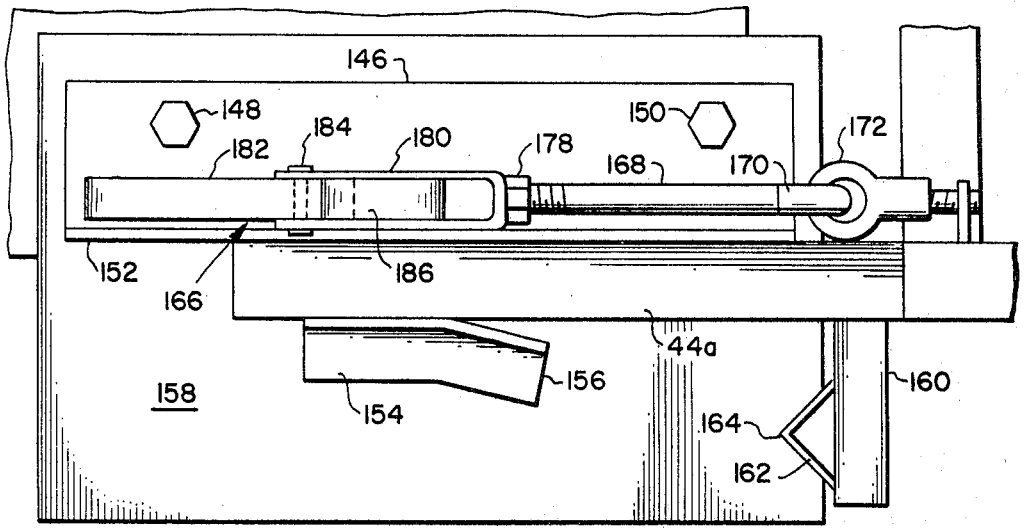
FIGURE 5 and FIGURE 6 are, respectively, the bottom and side views of an alternative means for securing the follower of this invention to a pickup for a vehicle of the type contemplated by this invention.
Figure 6:
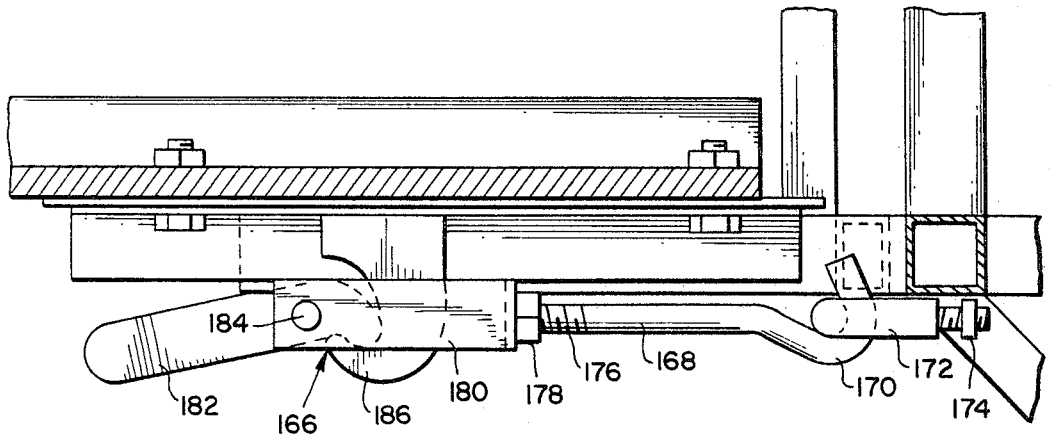

Referring to FIGURES 5 and 6, an alternative securing means may be provided. In this embodiment of the invention a plate 146 may be secured by bolts 148 and 150 to the frame of the self-propelled vehicle. The plate 146 is provided with an outwardly extending lip 152 and may be in the form of an angle iron. A supporting lug 154 which may have a downwardly turned front portion 156 is secured a spaced distance below the lip 152 on the plate 158 by welding or other means. The plate 158 is also secured to the frame by bolts 148 and 150. A tongue as shown at 44a is then received between the lip 152 and the supporting lug 154.

In the preferred form of this embodiment, a downwardly extending arm 160 is secured to the tongue 44a and is provided with an engaging member 162 which may be received in a notch 164 especially adapted for reception of the angle member 162. This prevents vertical movement of the tongue and rigidly positions the follower against the self-propelled vehicle.

An over-center means such as is shown generally at 166 is provided for forcing the follower against the self-propelled vehicle. The over-center means is secured by an elongate member 168 which may include a hook 170 thereon for being received in an eye 172 which is, in turn, secured as by a nut 174 to the follower. Adjustment of the length between the over-center securing means 166 and the eye 172 is provided by threads 176 and nut 178 on the elongate member 168. The over-center means is threadably received on the end of elongate member 168.

The over-center securing means comprises a U-shaped member 180, which in the bight portion threadably receives the end of elongate member 168 and an actuating lever member 182 which is pivotally secured between the free arms of the U-shaped member 180. The lever-like securing member 182 is adapted to be received in a hitch 186 which is secured to the frame. Since the operation of such over-center securing means is understood in the art, no further explanation is deemed necessary. While this embodiment of the securing means is highly effective it suffers from the disadvantage that one must crawl under the vehicle to actuate it. It was for this reason that the embodiment previously disclosed has been adapted.

Since the bumper of the self-propelled vehicle is covered by the follower it is necessary to provide a bumper such as at 188 on the rear ends of elongate members 38 and 40.

Of course the follower may be equipped, in the conventional manner, with reflectors, tail lights, signal lights and the like as is common practice.

While the invention has been described with reference to the combination of a pickup, camper, and the follower, it will be understood that the follower may be used for carrying other loads as well. Heavy loads of wood, metal or the like or heavy implements may be conveniently carried by a pickup since the load is distributed over a larger number of wheels. Therefore, while the preferred embodiment of the invention is the combination of the pickup and the camper along with the follower it will be understood that it is not intended that the invention be so limited.

In addition, it will be understood that while the invention has been abstracted, summarized, and disclosed with reference to the specific embodiments shown in the drawings that departures from the specific disclosure may be made without departing from the spirit and scope of the invention which is defined and limited in the following claims.

I claim:

1. In combination, a self-propelled vehicle having a frame and load bearing portion for supporting a camper house in part, and a detachable load bearing follower secured to said vehicle to underlie and support a part of said camper house, said combination comprising an elongated hollow tongue receiving channel member fixedly secured to each side, respectively, of said vehicle frame;

a cross member having its opposed ends fixedly connected on said channel members and extending transversely therebetween;

a vertically oriented ball hitch member mounted on said cross member;

said load bearing follower comprising:

a load bearing portion;

frame means carrying said load bearing portion;

wheel means secured on said frame means to support said frame means above a surface;

said frame means including a pair of opposed sides and a tongue extending forward from each side of said frame means;

said tongues being releasably received, respectively, within one of said channel members;

means for releasably forcing said frame toward said vehicle and to retain said tongues in their respective associated channels, said means comprising:

a substantially rigid J-shaped hook member having a leg portion pivotally mounted on said frame for movement about a vertical axis, and a foot section projecting laterally therefrom at an end thereof; and means connected on said hook member operable to move said foot section of said hook from a first position remote from said ball hitch member to a second position engaging said ball hitch member.

2. The combination of claim 1 wherein said operable means comprises:

an elongated arm member having an end pivotally connected on said first portion of said hook member;

the other end of said arm member extending to a side of said frame means; and means releasably securing said arm member on said frame in either of said two positions of said foot section of said hook member.

References Cited

UNITED STATES PATENTS

| 1,366,771 | 1/1921 | Devencenzi | 296—26 |
| 2,111,870 | 3/1938 | Nemec | 292—100 X |
| 3,337,259 | 8/1967 | Henson | 296—23 |

BENJAMIN HERSH, *Primary Examiner.*

JOEL E. SIEGEL, *Assistant Examiner.*

U.S. Cl. X.R.

296—23